United States Patent [19]

Numazawa et al.

[11] 4,258,586
[45] Mar. 31, 1981

[54] COMPACT TRANSMISSION FOR USE IN AUTOMOBILES

[75] Inventors: Akio Numazawa, Nagoya; Seitoku Kubo, Toyota; Koujiro Kuramochi, Toyota; Tatsuo Kyushima, Toyota, all of Japan

[73] Assignee: Toyota Jidosha Kogyo Kabushiki Kaisha, Toyota, Japan

[21] Appl. No.: 18,275

[22] Filed: Mar. 7, 1979

[30] Foreign Application Priority Data

May 19, 1978 [JP] Japan .................. 53-58824

[51] Int. Cl.³ ............................. F16H 37/08
[52] U.S. Cl. .................................... 74/695
[58] Field of Search ............... 74/695, 700, 701, 687, 74/688

[56] References Cited
U.S. PATENT DOCUMENTS 3,489,037   1/1970   Mori et al. ............................ 74/695

Primary Examiner—Werner H. Schroeder
Attorney, Agent, or Firm—Finnegan, Henderson, Farabow, Garrett & Dunner

[57] ABSTRACT

A vehicular transmission including an underdrive unit and an overdrive unit operatively interconnected by an intermediate shaft, each having at least one planetary gear system including a sun gear, a ring gear, planetary pinions and a planetary carrier wherein an extension member integral with the input gear of the overdrive unit axially extends around the periphery of the intermediate shaft and is operatively spline-coupled to the intermediate shaft. The transmission also includes bearings on the outer periphery of the extension member for supporting an output gear mounted for rotation axially between the underdrive and overdrive units; the output gear conveying transmission rotation to gears for driving the wheels of the vehicle.

12 Claims, 2 Drawing Figures

COMPACT TRANSMISSION FOR USE IN AUTOMOBILES

BACKGROUND OF THE INVENTION

1. Field of the Invention

This invention relates to a transmission for use in automobiles, and more particularly to a transmission for use in front-wheel drive or rear-wheel drive automobiles with an engine transversely mounted therein, wherein an automatic speed change gear and a final reduction gear are incorporated in combination.

2. Description of the Prior Art

With a view to affording an automobile increased space, automobiles having front-engine, front-wheel driving systems have become recently popular. Such automobiles have many advantages, such as compactness in size, reduction in weight and reduction in fuel consumption.

If an automatic speed change gear providing four forward speed range drives and one reverse drive is incorporated in the transmission for use with a front-wheel drive automobile having a laterally mounted engine, in order to reduce fuel consumption and to reduce noise, the overall length of the transmission increases and may interfere with the suspension of the automobile. This presents a serious problem, particularly in so-called compact cars.

To cope with such a problem, a compact transmission for use in an automobile has been developed providing an automatic speed change gear with at least four forward speed range drives and a reverse drive which does not interfere with the suspension device of the automobile. Such transmissions are generally disclosed in U.S. Pat. Nos. 4,056,988 and 4,063,468.

In such a transmission, the first two forward speed ranges and reverse are considered an underdrive unit and the third and fourth forward speed range are considered an overdrive unit. Each unit is conventionally contained in a separate case. The elements of the transmission are so arranged as to avoid interference with automobile suspension; the fluid-type torque converter, the underdrive unit and the overdrive unit are coaxial with each other and the shaft for transmitting the output of the transmission to the final reduction gear is substantially parallel to the axis of the torque converter. An output gear operatively interconnecting the overdrive unit with the final reduction gear is axially disposed between the overdrive and underdrive units with the final reduction gear being proximate the fluid-type torque converter.

SUMMARY OF THE INVENTION

It is an object of the present invention to provide a transmission for use in automobiles having a compact size while improving the durability of the transmission components.

In accordance with the invention, in a compact vehicular transmission having coaxial, operatively interconnected underdrive and overdrive units, each having output and input elements, an intermediate shaft operatively interconnecting the underdrive unit output element with the overdrive input element and an output gear axially disposed between the underdrive and overdrive units and being driven by the output element of the overdrive unit and driving a shaft parallel to the intermediate shaft transmitting power to a final reduction gear, the improvement comprises an axial extension member integral with the input element of the overdrive unit and spline-coupled at its inner periphery to the outer periphery of the intermediate shaft and a bearing means on the outer periphery of the extension member for supporting the output gear.

Preferably, the underdrive unit has two or more reduction gears having a value greater than one and the overdrive unit has two or more reduction gears having a value less than one.

The accompanying drawings, which are incorporated in and constitute part of this specification, illustrate one embodiment of the invention and, together with the description, serve to explain the principles of the invention.

DESCRIPTION OF PREFERRED EMBODIMENT

Figure 1:
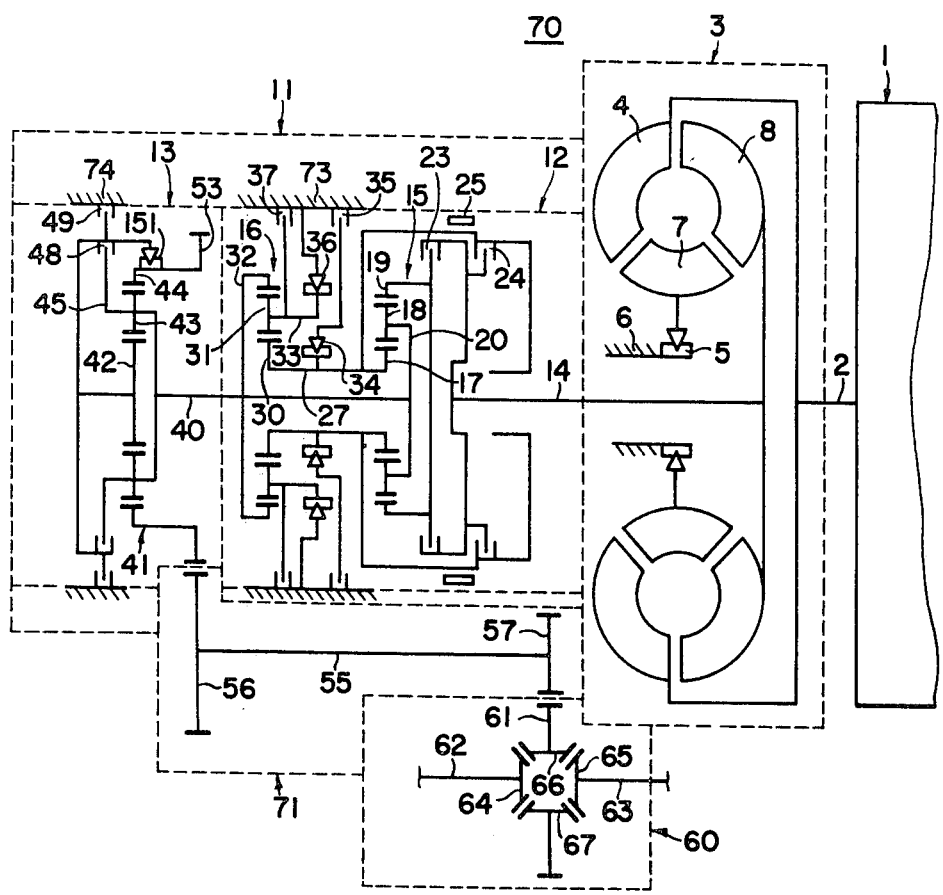
FIG. 1 is a schematic diagram showing the transmission according to the present invention.

FIG. 1 schematically represents an engine and transmission wherein an internal combustion engine 1 is mounted transversely to the vehicle parallel to the axles of an automobile between two wheels (not shown). The wheels may be the front wheels or the rear wheels. A crank shaft 2 of engine 1 is operatively connected to an automatic speed change gear 70 of the transmission. The transmission comprises automatic speed change gear 70 and a final reduction gear 60. Automatic speed change gear 70 includes a fluid type torque converter 3, an auxiliary speed change gear 11 and a transmission unit 71, and is attached to the engine laterally of the automobile. Fluid type torque converter 3 is a known structure, including a pump impeller 4 coupled to crank shaft 2, a stator 7 operatively connected by way of a one-way clutch 5 to a stationary portion 6, and a turbine runner 8.

Auxiliary speed change gear 11 includes an underdrive unit 12 and an overdrive unit 13 which are coaxial with crank shaft 2. Underdrive unit 12 has an input shaft 14 which extends in the axial direction of crank shaft 2 and is driven by turbine runner 8. Underdrive unit 12 has first and second planetary gear systems 15 and 16. First planetary gear system 15 includes a sun gear 17, planetary pinions 18, a ring gear 19 and a planetary carrier 20 rotatably supporting planetary pinions 18. A clutch unit 23 controls the driving relationship of input shaft 14 with ring gear 19, and a clutch unit 24 controls the driving relationship of input shaft 14 with a sun gear shaft 27 coupled to sun gear 17. A brake unit 25 governs the connection of sun gear 17 with fixed drive case 73. The ring gear 19 and the sun gear 17 of the first planetary system, separately or in combination, selectively comprise the input gear means of the underdrive unit 12.

Second planetary gear system 16 includes a sun gear 30, planetary pinions 31, a ring gear 32 and a planetary carrier 33 rotatably supporting planetary pinions 31. Sun gear 30 is driven by sun gear shaft 27. A one-way clutch 34 and a brake unit 35 are disposed in series relation to each other between sun gear shaft 27 and drive case 73. A one-way clutch 36 and a brake unit 37 are disposed in parallel relation to each other between carrier 33 and drive case 73. One-way clutches 34 and 36 are coaxial and in a superposed relation to each other as viewed in the radial direction.

An intermediate shaft 40 extending centrally of auxiliary speed change gear 11 is coaxial with input shaft 14 and operatively connected to planetary carrier 20 and ring gear 32, so as to transmit a driving force from underdrive unit 12 to overdrive unit 13. Planetary carrier 20 of the first planetary system 15, ring gear 32 of the second planetary system 16 and intermediate shaft 40 constitute the output gear means of the underdrive unit 12.

Overdrive unit 13 includes a planetary gear system 41. Planetary gear system 41 includes a sun gear 42, planetary pinions 43, a ring gear 44 and a planetary carrier 45 rotatably supporting planetary pinions 43. Carrier 45 is driven by intermediate shaft 40 and constitutes the input gear means of the overdrive unit 13. A clutch unit 48 controls the driving relationship of carrier 45 with sun gear 42, and a brake unit 49 controls the driving relationship of sun gear 42 with auxiliary case 74. Ring gear 44 of planetary gear system 41 is the output gear means of the overdrive unit 13.

Ring gear 44 is operatively coupled to and drives output gear 53, axially interposed between overdrive unit 13 and underdrive unit 12. A one-way clutch 151 controls the connection of sun gear 42 with ring gear 44 and output gear 53.

Transmission output unit 71 includes a transmission output shaft 55 extending substantially parallel to the intermediate shaft 40 and having at one end a driven gear 56 meshing with output gear 53 and at the other end a driving gear 57.

Final reduction gear 60 is positioned substantially at the midportion in the transverse direction of a vehicle, and driving gear 57 is positioned near torque converter 3, rather than driven gear 56. Driving gear 57 meshes with a gear 61 of final reduction gear 60. Output gear 53, transmission output unit 71 and final reduction gear 60 constitute gear means for transmitting the output of the overdrive unit 13 to the wheels of the vehicle.

Final reduction gear 60 is of a known structure, wherein left and right axle shafts 62 and 63 extend from side gears 64 and 65 in parallel to the axis of auxiliary speed change gear 11. Left and right axle shafts 62 and 63 are operatively connected to left and right wheels (not shown). Shafts which support pinions 66 and 67 rotatably are rotated along with gear 61, which shafts mesh with side gears 64 and 65, respectively.

Operation of the auxiliary speed change gear will be described with reference to the following table.

| Speed range | 23 | 24 | 25 | 35 | 37 | 34 | 36 | 48 | 49 | 151 |
|---|---|---|---|---|---|---|---|---|---|---|
| First speed | O | | | | O | | Δ | O | | Δ |
| Second speed | O | | O | O | | Δ | | O | | Δ |
| Third speed | O | O | | | | | | O | | Δ |
| Over-drive | O | O | | | | | | | O | |
| Reverse | | O | | | O | | | O | | Δ |

In this table, numerical figures represent clutches, brakes and one-way clutches shown; a circle (O) represents engaged clutches and brakes and a triangle (Δ) represents engaged one-way clutches when the engine is running. Engagement and disengagement of each clutch and brake are conventionally controlled by supply of an oil pressure from an oil pressure control device through an oil pressure servo mechanism. In the first and second speed range drives, one-way clutches 36 and 34 are maintained in an engaged position, thereby accomplishing the first and second speed drives. At the low speed range drive and the second speed range drive, brakes 37 and 25 are brought into engagement by supply of an oil pressure, whereby the first and second speed drives are maintained.

Figure 2:
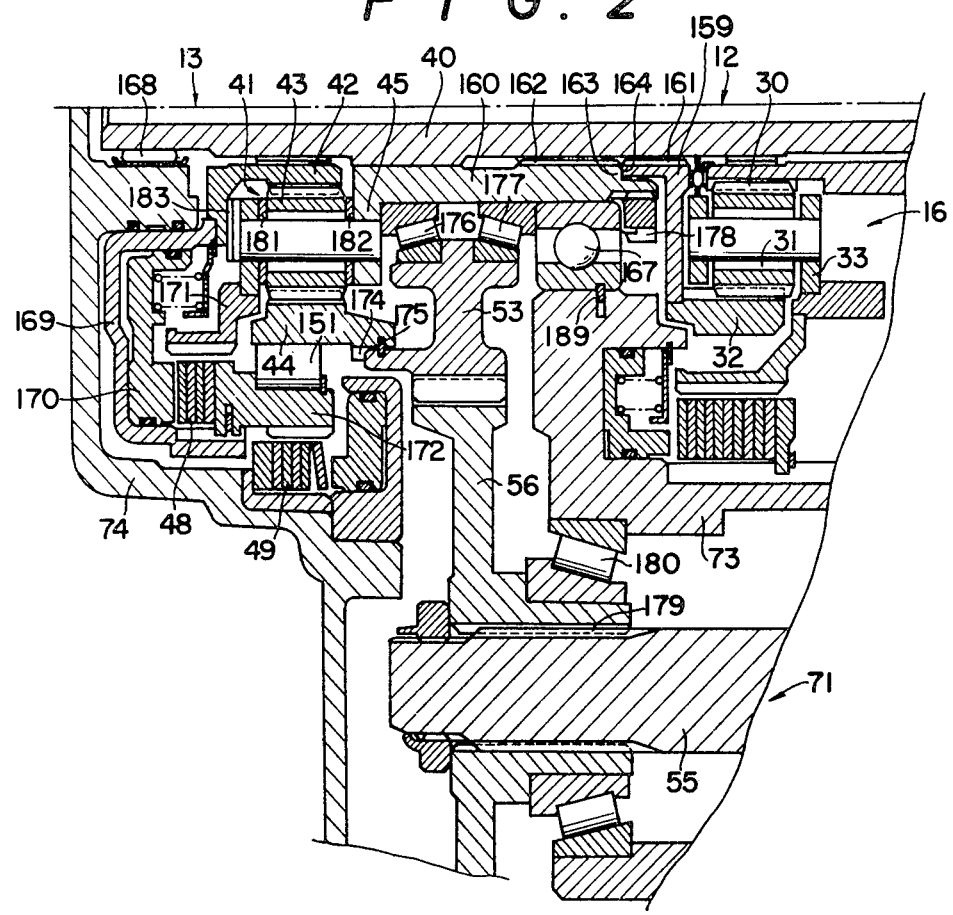
FIG. 2 is a partial view in longitudinal cross-section of the detailed construction of the bottom half of the transmission according to the schematic in FIG. 1.

FIG. 2 shows in detail a preferred embodiment of the present invention. In the underdrive unit 12, the output means or output driving element at the reverse drive is the ring gear 32 of planetary gear system 16 positioned axially between overdrive unit 13 and planetary gear system 15 (FIG. 1).

In accordance with the invention, there is provided an improvement to the compact vehicular transmission which includes an axial extension member integral with the overdrive unit input element and spline-coupled at its inner periphery to the outer periphery of said intermediate shaft.

As embodied herein, ring gear 32 has an axial extension member 159 extending axially along the outer periphery of intermediate shaft 40 of underdrive unit 12 which serves as an element of the output means thereof, and the inner peripheral surface of the member 159 is formed with splines 161, which in turn are fitted in outer peripheral splines of intermediate shaft 40.

Carrier 45 of planetary gear system 41 is the input driven element or input means of overdrive unit 13 and has an axial extension member 160 extending axially along the outer peripheral surface of intermediate shaft 40. Member 160 is provided with splines 162 on the inner peripheral surface, which in turn are fitted in the outer peripheral splines of intermediate shaft 40. The end 164 of member 159 with splines 161 and the end 163 of member 160 with splines 162 are positioned in opposing relation to each other on the outer peripheral surface of intermediate shaft 40 in a manner to be engageable with each other. Intermediate shaft 40 and carrier 45 are supported by underdrive case 73 and overdrive case 74 through the medium of a ball bearing 167 and a needle bearing 168, respectively.

Overdrive unit 13 includes planetary gear system 41, multiple disc clutch 48, multiple brake 49 and one-way clutch 151. Multiple disc clutch 48 is disposed between carrier 45 which is an input means or driven element of overdrive unit 13 and sun gear 42 which is another, reacting force element thereof; multiple disc brake 49 is provided between sun gear 42 and overdrive case 74; and one-way clutch 151 is disposed between sun gear 42 and ring gear 44 which is the output element of overdrive unit 13. A cylindrical drum 169 of multiple disc clutch 48 is operatively connected at the radially inner end thereof to sun gear 42, and houses therein a piston 170. A clutch hub 171 of multiple disc brake 48 is connected to carrier 45. A hub 172 of multiple disc brake 49 is operatively connected through the medium of cylindrical drum 169 to sun gear 42. One-way clutch 151 is positioned between ring gear 44 and hub 172 such that ring gear 44 is used as an inner race and hub 172 as an outer race.

Output gear 53, an element of the transmitting means, is disposed between underdrive unit 12 and overdrive unit 13, as viewed in the axial direction. Ring gear 44 of planetary gear system 41 serves as the output element of overdrive unit 13 and has a portion formed with splines 174. Ring gear 44 is coupled by means of splines 174 as well as a stopper ring 175 to output gear 53. Stopper ring 175 transversely engages the coupled peripheral surfaces of ring gear 44 and output gear 53 and restricts the relative movement in the axial direction of ring gear 44 to output gear 53.

In accordance with the invention, there is provided a further improvement to the vehicular transmission which includes bearing means on the outer periphery of the extension member of the overdrive unit input element for supporting the output gear.

As embodied herein, output gear 53 is supported through the medium of bearings 176 and 177 on the outer periphery of axial extension member 160 of carrier 45, which bearings are fixed by a nut 178 to carrier 45 through the medium of a bearing 167 so that these bearings are restricted in the axial movement thereof. Transmission unit 71, part of the transmitting means, includes driven gear 56 spline-fitted to transmission unit shaft 55 at a portion 179 thereof. Output gear 53 is operatively coupled to driven gear 56 which is supported through the medium of a bearing 180 by drive case 73. Since output gear 53 is supported on the axial extension member 160, it has a reduced outer diameter thereby improving the durability of output gear 53.

Preferably, the bearing means supporting the output gear 53 are a pair of tapered bearings 176 and 177, but other bearings such as roll bearings may be used.

The left end 164 of extension member 159 axially extending from ring gear 32 is engageable with the right end 163 of member 160 axially extending from carrier 45, so that if a pitch diameter of such gear or a helix angle thereof is properly determined, a thrust of planetary gear system 16 and that of planetary gear system 41 internally counterbalance each other, and hence a reacting force need not be received by the cases 73 and 74. Therefore, a thrust washer or bearing is no longer needed, resulting in a less costly device as well as the improved reliability in performance of the device.

Output gear 53 and ring gear 44 of planetary gear system 41 are connected to each other by means of splines, whereas the relative rotation in the axial direction of these gears is restricted, and the relative movement in the axial direction of one gear to another is also restricted by stopper ring 175. Consequently, a thrust by a helix angle of output gear 53 and that by a helix angle of ring gear 44 of planetary gear system 41 counterbalance each other, thus only exerting a reduced load on the bearings and the cases, resulting in the improved endurance of these members.

Sun gear 42 of planetary gear system 41 engages carrier 45 through the medium of washer 183, and the opposing ends of carrier 45 and ring gear 32 of planetary gear system 16 are maintained in engagement with each other. By such arrangement, a thrust created by a helix angle of sun gear 42 of planetary gear system 41 and that by a helix angle of ring gear 32 of planetary gear system 16 counterbalance each other, so that a reduced load is exerted on the bearings and the cases, resulting in the improved durability of these members.

In the case where the overdrive unit is so arranged that a one-way clutch is provided between carrier 45 serving as an input element of the overdrive unit and output gear 53 serving as an output element, and at the direct drive of the overdrive device, the driving force is transmitted from the carrier by way of the one-way clutch directly to the output gear 53, rather than by way of the planetary gear system 41, then no thrust is created even when the one-way clutch is brought into an engaging position, with the failure to offset a thrust in planetary gear system 16 in underdrive unit 12. In contrast thereto, in the arrangements according to the present invention, a thrust which originates from planetary gear system 16 and the thrust of a helical gear (output gear) 53 conveyed through ring gear 44 and sun gear 42 of planetary gear system 41 is counterbalanced upon engagement of one-way clutch 151. Stated otherwise, a thrust originating from ring gear 44 or sun gear 42 is transmitted by way of washer 183 to carrier 45, and by the engagement of carrier 45 with ring gear 32, the thrusts in both planetary gear systems counterbalance each other. Thus if the pitch diameter of each gear or a helix angle thereof is properly determined, the thrust of one gear and that of another gear internally counterbalance each other.

In the illustrated arrangements, two or more bearings 167, 176 and 177 are mounted on carrier 45 along the outer periphery thereof in a manner that output gear 53 and drive case 73 are supported by at least a single bearing, respectively. Preferably bearing 167 supports drive case 73 and bearings 176 and 177 support output gear 53. Bearings 176 and 177 receive a thrust, and a reacting force by these bearings is received by way of bearings 167 and 168 by drive case 73 and auxiliary case 74, respectively. The reacting force of tooth load on output gear 53 is received by two bearings 167 and 168 so as to reduce a moment load due to thrust load.

A differential rotation between output gear 53 and carrier 45 arises only at the overdrive range. The difference in rotation therebetween is extremely small. For example, assuming that i is representative of an overdrive gear ratio, and n is representative of an r.p.m. of carrier 45, then the rotation difference is (1-i)n. This value is small. A torque transmitted to output gear 53 is as small as iT, where T is the input torque of carrier 45. This permits bearings 176 and 177 to be of a small capacity. The outer race of bearing 167 and drive case 73 are rigidly secured to each other by means of stopper ring 189.

As here embodied, a plurality of bearings 167, 176 and 177 are mounted on carrier 45, which in turn is fitted by means of splines 162 to intermediate shaft 40 of underdrive unit 12. This spline-fitting facilitates adjustment of preload on tapered bearings 176 and 177 by means of nut 178 and provides ease of assembly. Preferably intermediate shaft 40 is of a rod shape to reduce manufacturing cost. Since eccentricity of the members for supporting the outer races of bearings 167, 176 and 177 (drive case 73 and output gear 53 in the embodiment) relative to intermediate shaft 40 is absorbed by the spline-fitting therebetween, there results an improved endurance of these members as well as reliability in performance thereof. Any eccentricity of pinions 43 supported by carrier 45 relative to intermediate shaft 40 is absorbed by the spline-fitting therebetween.

It will be apparent to those skilled in the art that various modifications and variations may be made in the elements of the invention without departing from the scope or spirit of the invention.

What is claimed is:

1. In a compact vehicular transmission including coaxial, operatively interconnected underdrive and overdrive units each having output and input elements, an intermediate shaft operatively interconnecting the underdrive unit output element with the overdrive unit input element and output gear axially disposed and mounted for rotation between the underdrive and overdrive units and being driven by the overdrive unit output element and driving a shaft parallel to the intermediate shaft transmitting power to a final reduction gear, the improvement comprising:

an axial extension member integral with the overdrive unit input element and spline-coupled at its inner periphery to the outer periphery of said intermediate shaft; and bearing means on the outer periphery of said extension member for supporting said output gear.

2. In a compact vehicular transmission including coaxial, operatively interconnected underdrive and overdrive units each having output and input elements, an intermediate shaft operatively interconnecting the underdrive unit output element with the overdrive unit input element, and an output gear axially disposed and mounted for rotation between the underdrive and overdrive units and being driven by the overdrive unit output element, said underdrive unit having 2 or more reduction gear ratios whose value is greater than 1 and said overdrive unit having a reduction gear ratio whose value is less than 1, the improvement comprising:

an axial extension member integral with the input element of said overdrive unit and spline-coupled at its inner periphery to the outer periphery of said intermediate shaft; and bearing means on the outer periphery of said extension member for supporting said output gear.

3. The compact transmission of either of claims 1 or 2 wherein said bearing means is a pair of tapered bearings.

4. The compact transmission of claims 1 or 2 wherein said bearing means is a roll bearing.

5. A compact transmission for a vehicle having a transversely-mounted engine, the crank shaft of such engine being parallel to the axles of the vehicle and driving said transmission the output of which drives the wheels of the vehicle, the transmission comprising:

(a) a fluid-type torque converter coaxial with and driven by the crankshaft of said engine;

(b) an underdrive unit having an axial input shaft coaxially operatively connected to and driven by said torque converter and comprising at least one planetary gear system including an input gear means driven by said input shaft and an output gear means;

(c) an intermediate shaft operatively connected to and driven by the underdrive output gear means;

(d) an overdrive unit comprising at least one planetary gear system including an input gear means and an output gear means, said input gear means being coaxially coupled to and driven by said intermediate shaft;

(e) an axial extension member integral with said overdrive input gear means and spline-coupled at its inner periphery to the outer periphery of said intermediate shaft;

(f) transmission output gear means being mounted for rotation axially between said underdrive and overdrive units and being driven by the output gear means of the overdrive planetary system;

(g) bearing means on the outer periphery of said extension member for supporting said transmission output gear means; and (h) gear means operatively coupled to said transmission output gear means to transmitting the output of said transmission to the wheels of said vehicle.

6. The compact transmission of claim 5 wherein said underdrive unit comprises first and second operatively interconnected coaxial planetary gear systems and said overdrive unit comprises a third planetary gear system coaxial with said first and second systems, each of said planetary gear systems having ring and sun gears, planetary pinions and a planetary carrier, and wherein said overdrive input gear means is the overdrive planetary carrier and said overdrive output gear means is the overdrive planetary ring gear.

7. The transmission of claim 5 wherein the underdrive unit provides two or more reduction ratios having a value greater than 1 and the overdrive unit provides a reduction ratio having a value less than 1.

8. The transmission of claim 5 wherein said bearing means is a pair of tapered bearings.

9. The transmission of claim 5 wherein said bearing means is a roll bearing.

10. In a compact vehicular transmission driven by an engine including coaxial operatively interconnecting underdrive and overdrive units each having output and input elements and being driven by said engine, an intermediate shaft extending axially of said transmission, and an output gear coaxially disposed and mounted for rotation between said underdrive and said overdrive units and being driven by said underdrive and overdrive units, the improvement comprising:

an axial extension member integral with the overdrive unit input element and spline coupled to said intermediate shaft; and bearings the inner races of which are fixed to the axial extension member for supporting said output gear.

11. The compact transmission of claim 10 wherein said bearings are a pair of tapered roller bearings.

12. The compact transmission as in claim 11, wherein said intermediate shaft constitutes said output means of said underdrive unit.

* * * * *